(12) United States Patent
Putz

(10) Patent No.: US 10,247,267 B2
(45) Date of Patent: Apr. 2, 2019

(54) ELECTRICALLY ACTUATED FRICTION BRAKE

(71) Applicant: VE VIENNA ENGINEERING FORSCHUNGS-UND ENTWICKLUNGS GMBH, Vienna (AT)

(72) Inventor: Michael Putz, Sebersdorf (AT)

(73) Assignee: VE VIENNA ENGINEERING FORSCHUNGS-UND ENTWICKLUNGS GMBH, Vienna (AT)

( * ) Notice: Subject to any disclaimer, the term of this patent is extended or adjusted under 35 U.S.C. 154(b) by 0 days.

(21) Appl. No.: 14/774,397

(22) PCT Filed: Mar. 10, 2014

(86) PCT No.: PCT/EP2014/054531
§ 371 (c)(1),
(2) Date: Sep. 10, 2015

(87) PCT Pub. No.: WO2014/139919
PCT Pub. Date: Sep. 18, 2014

(65) Prior Publication Data
US 2016/0025168 A1    Jan. 28, 2016

(30) Foreign Application Priority Data
Mar. 11, 2013  (AT) .............................. A 50165/2013

(51) Int. Cl.
*F16D 65/18*    (2006.01)
*F16D 55/225*    (2006.01)
(Continued)

(52) U.S. Cl.
CPC ........... *F16D 65/18* (2013.01); *F16D 55/225* (2013.01); *F16D 2121/14* (2013.01);
(Continued)

(58) Field of Classification Search
CPC ............... F16D 55/225; F16D 55/2245; F16D 55/2255; F16D 65/18; F16D 2121/14;
(Continued)

(56) References Cited

U.S. PATENT DOCUMENTS

| 4,275,609 A | * | 6/1981 | DeLaney | ............... | F04B 47/022 188/69 |
| 5,501,305 A | | 3/1996 | Staltmeir | | |

(Continued)

FOREIGN PATENT DOCUMENTS

| CN | 101008425 | 8/2007 |
| CN | 102428292 | 4/2012 |

(Continued)

OTHER PUBLICATIONS

English Machine Translation of WO-0144677.*
(Continued)

*Primary Examiner* — Melody M Burch
(74) *Attorney, Agent, or Firm* — Greenblum & Bernstein, P.L.C.

(57) ABSTRACT

To reduce the attainable actuation times of an electrically actuated friction brake and simultaneously keep the friction brake inexpensive, a second transmission element (8) with an elevation curve (17) is proposed in which a coupling element (15) is provided on a first transmission element (5), and on the coupling element (15) there is arranged a follower element (14) which follows the elevation curve (17) under the action of the electric actuator (12) for the actuation of the first transmission element (5).

14 Claims, 5 Drawing Sheets

(51) Int. Cl.
*F16D 121/24* (2012.01)
*F16D 125/64* (2012.01)
*F16D 127/00* (2012.01)
*F16D 121/14* (2012.01)
*F16D 125/32* (2012.01)
*F16D 121/18* (2012.01)
*F16D 125/30* (2012.01)
*F16D 121/26* (2012.01)

(52) U.S. Cl.
CPC ...... *F16D 2121/18* (2013.01); *F16D 2121/24* (2013.01); *F16D 2121/26* (2013.01); *F16D 2125/30* (2013.01); *F16D 2125/32* (2013.01); *F16D 2125/64* (2013.01); *F16D 2125/645* (2013.01); *F16D 2127/007* (2013.01)

(58) Field of Classification Search
CPC ............ F16D 2121/18; F16D 2121/24; F16D 2125/28; F16D 2125/32; F16D 2125/64; F16D 2125/645; F16D 2127/007; F16D 2129/06; F16D 2129/10; F16D 2121/26; F16D 2125/30
See application file for complete search history.

(56) References Cited

U.S. PATENT DOCUMENTS

| | | | |
|---|---|---|---|
| 6,332,514 B1* | 12/2001 | Chen | F16D 67/02 188/2 D |
| 6,851,525 B2 | 8/2005 | Baier-Welt | |
| 7,806,239 B2 | 10/2010 | Tonpli | |
| 9,127,735 B2 | 9/2015 | Putz | |
| 2002/0104733 A1 | 8/2002 | Tulaczko | |
| 2003/0034212 A1* | 2/2003 | Gradert | B60T 13/04 188/167 |
| 2004/0026184 A1* | 2/2004 | Baumann | F16D 65/18 188/72.7 |
| 2005/0029858 A1* | 2/2005 | Forster | B60T 13/741 303/20 |
| 2012/0168264 A1 | 7/2012 | Putz | |
| 2015/0114771 A1* | 4/2015 | Putz | B60T 7/042 188/158 |
| 2015/0377309 A1* | 12/2015 | Putz | F16D 65/18 188/156 |

FOREIGN PATENT DOCUMENTS

| | | |
|---|---|---|
| DE | 38 24 812 | 1/1990 |
| DE | 197 23 394 | 12/1997 |
| DE | 198 51 668 | 5/2000 |
| DE | 101 40 075 | 2/2003 |
| DE | 102006012076 | 9/2007 |
| DE | 102009029594 | 3/2011 |
| EP | 1 726 499 | 11/2006 |
| GB | 2 313 885 | 12/1997 |
| JP | 10-81158 | 3/1998 |
| WO | WO 01/44677 | 6/2001 |
| WO | WO 01/90595 | 11/2001 |
| WO | WO 2004/048792 | 6/2004 |
| WO | WO 2010/0133463 | 11/2010 |
| WO | WO 2014/139919 | 9/2014 |

OTHER PUBLICATIONS

English Machine Translation of DE-10140075.*
Internal Search Report issued in PCT/EP2014/054531 and dated May 15, 2014.
Austrian Search Report issued in counterpart Austrian application No. A 50165/2013.
Chinese Search Report and Office Action issued in CN 2014800226222 (18 pages).

* cited by examiner

ELECTRICALLY ACTUATED FRICTION BRAKE

CROSS-REFERENCE TO RELATED APPLICATIONS

The present application is a U.S. National Stage of International Patent Application No. PCT/EP2014/054531 filed Mar. 10, 2014, and claims priority of Austrian Patent Application No. A50165/2013 filed Mar. 11, 2013.

BACKGROUND OF THE INVENTION

1. Field of the Invention

The present invention relates to an electrically actuated friction brake with a brake pad actuated by an actuation device, wherein the actuation device is driven by an electrical actuator and comprises a first transmission element that is connected to the brake pad and the actuation device rotates the first transmission element about a rotational angle for a brake action to achieve a pad pressing force and the first transmission element requires an input torque depending on the rotational angle for achieving the pad pressing force.

The present invention relates to electrically actuated brakes, thus to brakes in which an electrical actuator such as an electric motor, via transmission parts such as levers, screws, ball screws, cams, eccentrics, fluids, gases, etc., presses on the brake pad, such as a brake disc for example, on the friction surface, such as a brake disc or brake drum, for example. The design of the force characteristics over the actuation travel in electrically actuated brakes is important for the actuation time and the energy expenditure for applying the braking torque.

2. Discussion of Background Information

Especially for electrically actuated service brakes of vehicles, there are high standards with regard to short actuation times and pressing force requirement. For example, today's vehicles demand an actuation time for full braking of around 200 ms. At the same time, in modern vehicle front wheel disc brakes, brake pad pressing forces of 30 to 40 kN can arise, in many cases even significantly more. Since actuation travel * pad pressing force is the energy requirement for actuation of the brake and leads to the required actuation power for a given actuation time, it is apparent that the electrical actuators require accordingly high levels of electrical power. If an actuation travel of 2 mm is covered for full braking for 40 kN of pad pressing force, the energy requirement is roughly 40 Ws. If the braking process here takes 0.2 s, an average mechanical power of at least 200 W per brake is required, which must be provided by the electrical actuator. Available mounting space, weight, costs, and current requirement for the electrical actuator require that the motor power be kept low, which is why an optionally large electrical actuator cannot be used.

For a linear electrically actuated brake, i.e., for linear transmission elements such as screws, ball screws, and fluids with a linear relationship between the actuation travel and actuator (force, torque), a pad pressing force rising linearly from zero to a maximal value is necessary, under the assumption of a constant coefficient of friction. The necessary transmission ratio of the linear brake is determined here by the required maximal force (full braking), as this must be guaranteed, and remains constant for all lower pad pressing forces. That is disadvantageous, however, because, in all other, generally more frequent cases, the electrical actuator cannot be optimally utilized and is over-dimensioned. For such a linear brake, the electrical actuator is thus operated, up to design full braking, with a smaller than possible load, while the transmission ratio and thus also the attainable actuation time are determined by the constantly high transmission specified for the case of full braking. As a result, optimal and/or short-as-possible actuation times cannot be achieved for linear brakes for braking that does not correspond to the case of full braking.

In addition, the cost pressure on electrically actuated brakes is also high, because they have to compete with relatively simple hydraulic brakes. Therefore, any possible cost optimization of the electrical actuator is important. It is understood here that the smaller the electrical actuator can be kept, the more advantageous it will be.

Non-linear electrically actuated brakes such as those described in WO 2010/133463 A1, in which a non-linear transmission element, such as a cam, eccentric, non-linear ramp, etc., is provided between the actuator and brake pad, offer an improvement over linear brakes. In WO 2010/133463 A1, for example, a shaft with an eccentric pin, or a cam to which the brake pad is secured, is turned by an actuation means. Here the torque of an electric motor is transmitted via a linkage and lever to the non-linear transmission element of the brake. Due to the eccentricity of the pin or cam, the brake pad is pressed against the friction surface, and a non-linear relationship arises between the actuation travel or angle of rotation of the shaft and the pad pressing force or the arising braking torque. Due to the eccentric or cam, a force transmission also arises (a small travel effects a high force), whereby the electrical actuator can be dimensioned so as to be smaller. This also makes it possible to shorten the actuation times in comparison with a linear electrically actuated brake.

As a rule, the installation conditions of the brake, in particular for vehicle brakes, are such that only a very limited mounting space is available to receive the brake, so that electrical motors of small size have to be used. The very high pressing force of the brake pad must be produced from the high speed of the preferably small electric motor. Instead of the linkage and lever of WO 2010/133463 A1, this can be also be achieved, for example, by a transmission driven by an electric motor. For example, the output stage of the transmission rotates the shaft that is integrated in the transmission and has the eccentric or cam, while the non-linear transmission element again acts on the brake pad. With such a transmission, even transmissions of 1:40 can be implemented in a tiny mounting space, whereby small electric motors can be used. The actuation time can thus be reduced even further. But such transmissions are very complex and therefore also expensive.

A parking brake is known from WO 01/90595 A1 in which a brake actuating linkage is actuated by an electrically driven drive connection. The drive connection is embodied in the form of a cam disc that is rotated by the electric motor and an adjusting element guided along a surface of the cam disc. The cam disc can be embodied such that a constant torque is set on the electric motor in order to shorten the braking time and to achieve a particularly rapid translational movement of the brake actuating linkage.

For release of a friction brake, often a return spring is tensioned, which is released during release of the friction brake, and opens the friction brake by means of the energy released thereby. For example, DE 10 2006 012 076 A1 shows an electrically actuated friction brake in which a return spring is tensioned during actuation, and is released for release. The electrical drive must therefore supply energy for tensioning the release spring during the entire actuation of the friction brake.

SUMMARY OF THE EMBODIMENTS

It is an object of the present invention to reduce the attainable actuation times of an electrically actuated friction brake and simultaneously to keep the friction brake inexpensive.

This object is achieved according to the invention through the provision of a second transmission element with an elevation curve and a coupling element provided on the first transmission element, wherein a follower element is arranged on the coupling element that follows the elevation curve under the action of the electrical actuator for actuating the first transmission element, wherein the second transmission element provides the input torque for the first transmission element and in that the input torques of the first transmission element over the rotational angle for different wear states of the brake pad result in an envelope curve and the input torque provided by the second transmission element over the rotational angle covers the range of the envelope curve. The second transmission element can supply much of the transmission required in the actuation device, whereby the electrical actuator is released. In the example of a transmission motor, for an otherwise identical friction brake, the transmission of the motor transmission can be reduced from 1:40 down to 1:12 (in the case of a non-linear second transmission element), because the second transmission element supplies force transmission (or torque transmission). A savings of 1 to 2 transmission stages can thus be achieved in the motor transmission, and hence a cost reduction. Simultaneously, the output torque of the electrical actuator becomes smaller, so that significantly smaller gears can be used in the motor transmission, which again results in a further price advantage. Due to the additional transmission of the second transmission element, however, the actuation time of the friction brake is also reduced. Conversely, at an actuation time to be achieved, the motor size can also be reduced. Likewise, operation can be ensured over the entire wear state of the friction brake.

The connection of the coupling element and of the first transmission element is done in a mechanically very simple manner if a first end of a lever in the coupling element is rotatably mounted and a second end of the lever is connected to the first transmission element.

A very especially simple and advantageous embodiment results if the second transmission element is embodied as a cam disc or as a sliding guide with an elevation curve and the electrical actuator rotates the cam disc or the sliding guide. In this way, the actuation device can be implemented by simple and robust means and in a very compact manner.

If two first transmission elements are provided, it is advantageous if they each be connected via a lever to the coupling element for formation of a parallelogram drive. By means of the parallelogram, a forced synchronization of the two transmission elements is effected in a simple and inexpensive manner.

In an alternative embodiment, the coupling element is designed as a rocker lever, whose knee joint is guided by a follower element along the elevation curve, wherein the electrical actuator acts on the first leg of the rocker lever, and the other leg of the rocker lever is connected to the first transmission element. By means of the rocker lever, especially high transmissions can be implemented in the second transmission element.

A very simple parking brake function can be implemented if an indentation is provided in the elevation curve, in which the follower element assumes a stable position. The actuation device can thus be fixed in a specific position (parking brake) and can no longer be released except by an outside force.

The first transmission element is preferably embodied as an eccentric drive or a cam drive, since high transmissions can thereby be implemented with short actuation travels.

It is very especially advantageous if the elevation curve is formed according to the path translation characteristic of the first transmission element. A substantially constant torque of the electrical actuator can be achieved in this manner. The electrical actuator can therefore always be driven over the entire actuation range of the actuation device in a specific torque range, in which favorable efficiencies can be achieved.

In order to achieve an automatic release of the friction brake over the entire actuation range, a release spring is advantageously provided that acts on the actuation device. If the release spring is tensioned or released via a spring follower element provided on the first transmission element, the range in which the release spring is tensioned or released can be controlled in a purposeful manner. In this way, the release spring can provide supplemental energy in specific ranges of the actuation range for return or actuation of the friction brake, and in other ranges support the electrical actuator in actuation or return of the friction brake.

Further effects and advantages of the of the present friction brake follow from the following description.

BRIEF DESCRIPTION OF THE DRAWINGS

The present invention is explained in more detail below with reference to FIGS. 1 to 9, which show exemplary, schematic, and non-restrictive advantageous embodiments of the invention.

DETAILED DESCRIPTION OF THE EMBODIMENTS

Figure 1:
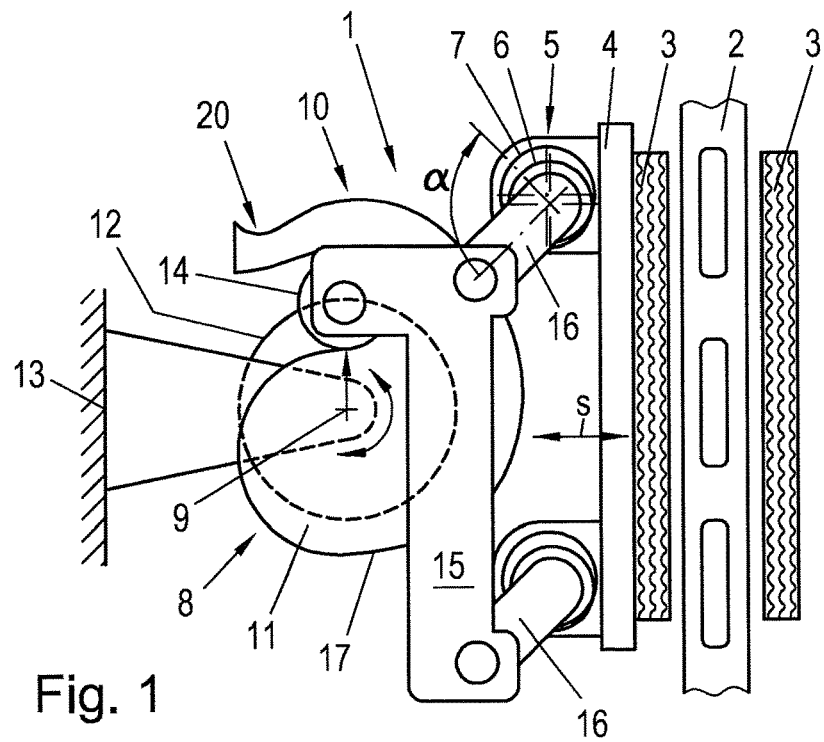
FIG. 1 shows a representation of a friction brake according to the invention.

FIG. 1 shows schematically an advantageous exemplary embodiment of a friction brake 1 according to the invention, here in the form of a disc brake with a brake disc as a friction surface 2 and a brake pad 3, which is pressed by means of an actuation device 10 on the friction surface 2 for braking. The friction brake 1 could also be embodied as a drum brake, however, and could of course also brake linear movements, i.e., a flatiron as a friction surface instead of a brake disc, for example. Like here, the brake pad 3 can also be arranged on a brake pad carrier 4. The friction brake 1 can be designed as a sufficiently known floating caliper brake, for example.

Components of such a friction brake 1 known per se are not shown here for reasons of clarity, or are only suggested.

A first transmission element 5 connected to the brake pad 3 (or the pad carrier 4) and interacting with same acts on the brake pad 3 or the pad carrier 4. The first transmission element 5 is embodied here, for example, as an actuation shaft 6, on which an eccentric journal 7 is provided (suggested by means of the displaced rotational axes). For example, an eccentric journal 7 can be formed on the actuation shaft 6, or an eccentric, axial borehole, into which a journal 7 is inserted, can be provided in the actuation shaft 6. The actuation shaft 6 is rotatably mounted on a fixed part, for example on the brake caliper, or quasi-fixed part, for example on a wear adjuster, of the friction brake 1. The brake pad 3 or the pad carrier 4 is arranged on the journal 7. If the actuation shaft 6 is pivoted by a rotational angle α, the brake pad 3 moves the actuation travel s toward the friction surface 2 or away from same (suggested by the double arrow), depending on the direction of rotation. Instead of an eccentric journal 7, a cam can also be provided as the transmission element 5. For example, a rotational angle α of 90° from non-braking to full braking can be provided, and the eccentric or the cam can be geometrically designed in order to ensure the actuation travel s necessary for braking. This type of actuation of a friction brake 1 is described in WO 2010/133463 A1.

Moving the brake pad 2 against the friction surface 2 by means of a first transmission element 5 produces, starting with contact, a normal force (pad pressing force $F_N$) that effects the braking force or the braking torque. The normal force is thereby produced by the first transmission element 5 and is also received in full by the latter. That is, the normal force is fully supported by the transmission element 5. Even an increased normal force due to potentially arising self-reinforcement effects is supported by the transmission element 5.

In principle, the pressing of the brake pad 3 against the friction surface 2 can be implemented with any geometry and method that brings a "height gain," i.e., a travel in the direction of the brake pad 3. The first transmission element 5 is preferably non-linear. This means that there is no linear relationship between the input (here the rotational angle α, for example) and the output (here the actuation travel s, for example). It is also conceivable for the first transmission element 5 to be linear, however, for example as a cam with a linear elevation curve. The first transmission element 5 is also conceivable as a ball ramp or as rolling movement with thread turns. A cam is a rolled oblique plane, whereby it also being possible for the rolled plane to be rolling or in an any curve or surface in a plane or space, for example also as a helix or multiple helix, such as a ball ramp, thread turns, or rolling pitch, for example. Likewise, the first transmission element 5 can also comprise a hydraulic or pneumatic cylinder with pistons that is actuated for example by an eccentric or cam.

According to the invention, a second transmission element 8 is now provided in the friction brake 1 which interacts with the first transmission element 5 as described below.

Here, the second transmission element 8 comprises a cam disc 11 rotatably mounted on a center of rotation 9 and having an elevation curve 17, which is driven by an electrical actuator 12, here for example an electric motor of a transmission motor. The cam disc 11 or the electrical actuator 12 is supported on a fixed part 13 of the friction brake 1, such as for example a brake caliper or a not shown, sufficiently known wear adjuster (regarded as quasi fixed), as suggested in FIG. 1. A follower element 14, for example a needle bearing, rolls on the cam disc 11, whereas the follower element 14 being rotatably mounted on a coupling element 15. Depending on the shape of the elevation curve 17, the second transmission element 8 is thus linear or non-linear. Furthermore, the ends of two levers 16 are rotatably mounted on the coupling element 15. In each case, the opposing ends of the levers 16 are secured to the actuation shaft 6. From a mechanical standpoint, the coupling element 15 is a roller cam follower that is simultaneously part of a parallelogram drive. Of course, only one first transmission element 5 could be provided, in which case also only one lever 16 would be necessary. Likewise, more than two first transmission elements 5 could also be provided, and thus also more than two levers 16.

If the curve disc 11 is rotated for example by the electrical actuator 12 clockwise, the follower element 14 rolls on the cam disc 11, whereby the coupling element 15 is moved up or down according to the curve shape of the cam disk 11. Due to the movement of the coupling element 15, the actuation shaft 6 is simultaneously rotated via the lever 16, and the brake pad 3 is pressed against the friction surface 2. To raise the brake pad 3 from the friction surface 2, the cam disc 11 is rotated in the opposite direction.

The kinematics of the actuation device 10 of the friction brake 1 thus consist of the path translation ratio (or equivalently the force- or torque transmission ratio) of the first transmission element 5 and the second transmission element 10.

The elevation curve 17 of the second transmission element 10 can also be implemented by a sliding guide instead of a cam disc 11. The elevation curve 17 can thus also be repeatedly rolled or spatially formed, thus enabling a range of rotation of more than 360° between the initial and end position. For example, the cam disc 11 can be formed as a helix, and the cam disc 11 can always be correctly positioned by a feed device, for example a thread. A sliding guide could also be formed in a spiral shape.

The elevation curve 17 of the cam disk 11 or a sliding guide or, more generally, any desired elevation curve 17 in space or in a plane can naturally be followed in any mechanically reasonable manner, i.e., apart from the described roller cam follower, a rocker lever or other guide of the follower element 14 as well. Following can naturally also be implemented differently than with a roller bearing, for example by means of a roller, a sliding contact, or a ball. Consequently, following is understood as rolling or sliding of the follower element 14 on the elevation curve 17.

The coupling element 15 can also be embodied in multiple parts, for example several elements or levers connected in an articulated manner.

The elevation curve 17 of the cam disc 11 (or of the sliding guide) can also have a range that is shaped such that the follower element 14 in this range assumes a stable or energy-favorable position, so that the second transmission element 8 therefore cannot independently return, without external forces, in the direction of the unbraked position. This is provided in FIG. 1, for example, at the end of the elevation curve 17 of the cam disc 11 in the form of an indentation 20. If the follower element 14 comes to rest in this indentation, the follower element 14 cannot advance on its own from this position without the action of an external force, for example the electrical actuator 12, a wire rope, or the like. This can be used for a parking brake function, for example.

A parking brake function can also be implemented by means of a detent latch. If, due to actuation of the actuation device 10, a detent latch passes a specific position and engages, the actuator position (parking position) is likewise fixed. For unlatching, for example in order to release the parking brake, the detent latch must be released again, for example by means of a wire rope. An electromagnet can also be used to push the detent latch against a spring. The detent latch then remains locked in the parking position without magnetic action due to friction. For release, the actuation device 12 can be moved somewhat further along, whereby the friction is reduced and the spring releases the detent latch.

Figure 2:
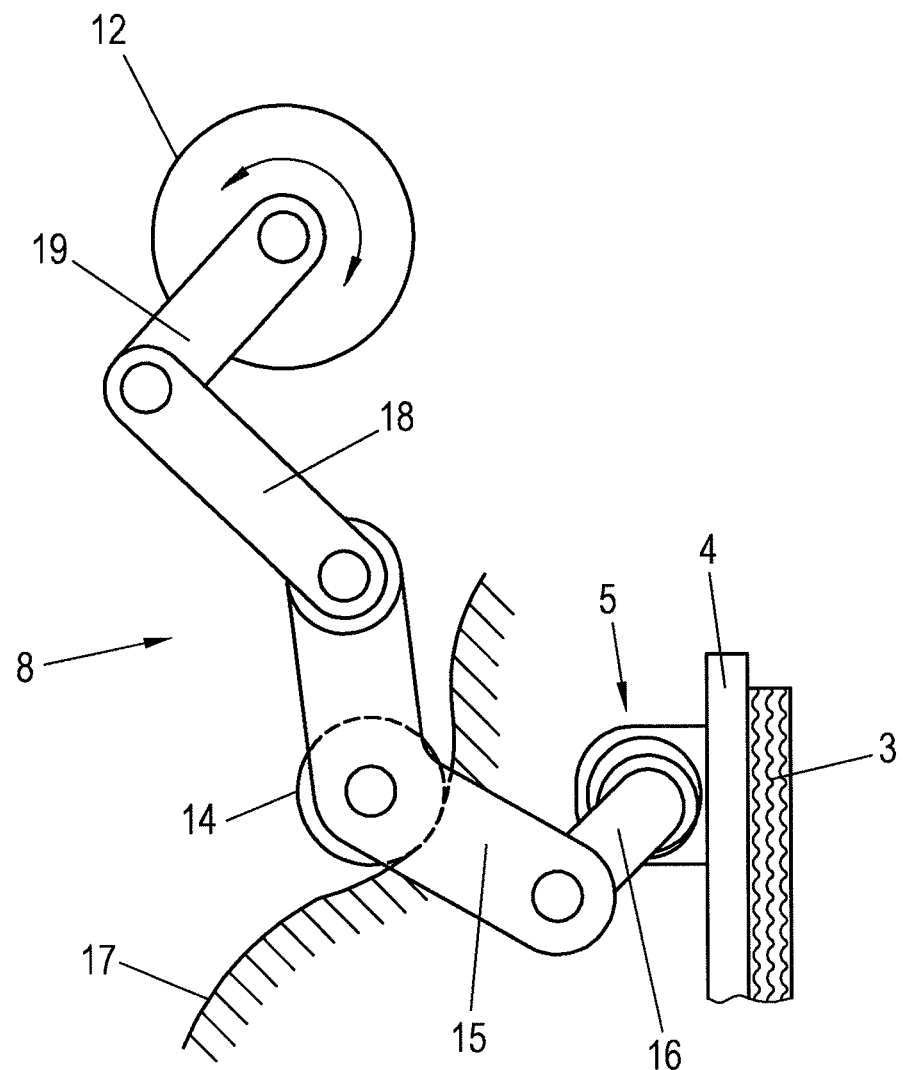
FIG. 2 shows an alternative embodiment of the actuation device.

In an alternative embodiment of the inventive friction brake 1 according to FIG. 2, a follower element 14 is again rotatably mounted on the coupling element 15, and again rolls on an elevation curve 17 of the second transmission element 8. The coupling element 15 is embodied here as a rocker lever, whereby the knee joint is rolling on the elevation curve 17 by means of the follower element 14. On one leg of the coupling element 15 is again hinged one end of the lever 16, by means of which a cam is rotated. An actuation lever 18, which is actuated by means of a motor lever 19 driven by the electrical actuator 12, acts on the other leg of the coupling element 15. However, a linear drive could also act on the actuation lever 18. The elevation curve 17 is arranged in a fixed position.

Other rolling guides are also conceivable. For example, the follower element 14, which rolls on the elevation curve 17, could also be guided with a sliding guide or a journal, which slides in a borehole.

Figure 3:
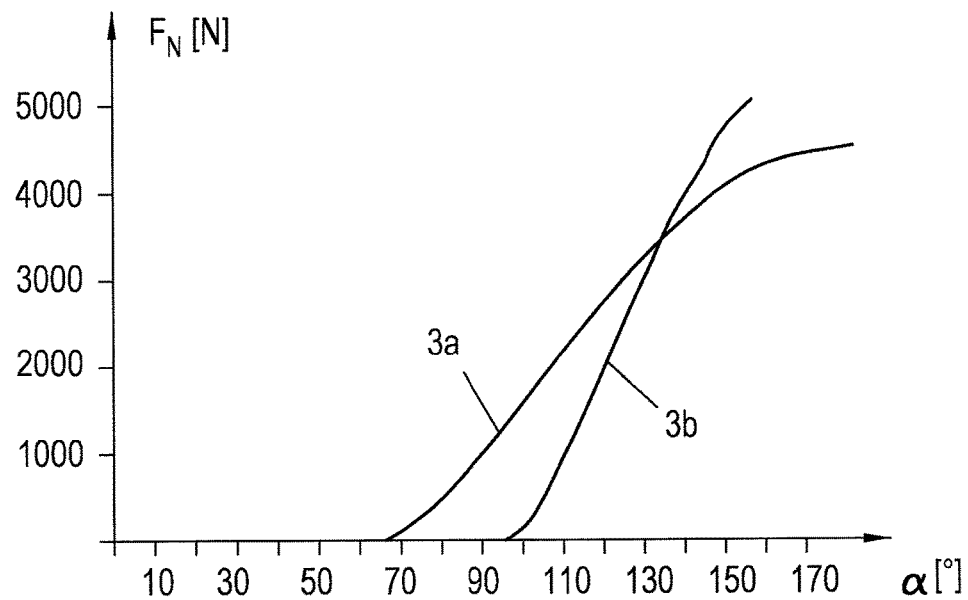
FIG. 3 shows the pad pressing force over the actuation range of the first transmission element.

The starting point for the design of a friction brake 1 according to the invention can for example be a predetermined pad pressing force $F_N$-actuation travel s diagram or a pad pressing force $F_N$-rotational angle α diagram, as shown in FIG. 3. The diagram can reflect a linear or non-linear (as in FIG. 3) relationship. Such a diagram arises for example from the fundamental brake design, which considers the stiffnesses of the brake parts and the geometry of the first non-linear transmission element 5, i.e. for example the geometric relationships on the eccentric, and is thus to be regarded as known, or it is predetermined according to the application. Different wear states of the friction brake 1 can also be considered. In FIG. 3, the curve 3a shows the brake without wear, and the curve 3b shows the brake with full wear. The stiffness of the friction brake 1 is altered significantly as a result of the wear of the brake pad 3. Likewise, the temperature influence on the stiffness of the friction brake 1 can also be considered.

Figure 4:
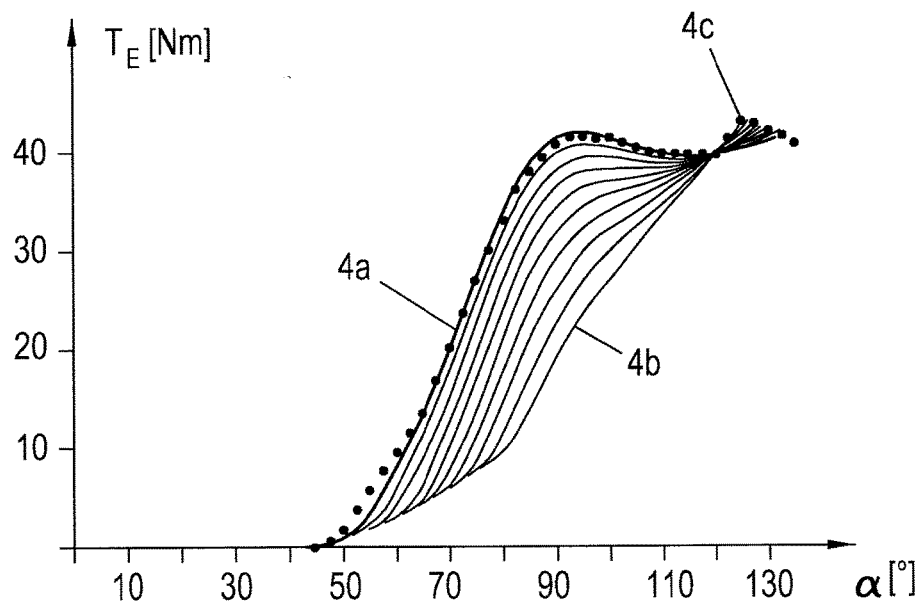
FIG. 4 shows the input torque in the first transmission element over its actuation range.

From this pad pressing force $F_N$-rotational angle α diagram, the required input torque $T_E$ of the first transmission 5 can be obtained from the known geometric relationships to achieve the pad pressing forces $F_N$, as shown in FIG. 4. Different wear states are again shown here, whereby the curve 4a again reflecting the friction brake 1 without wear, and the curve 4b the friction brake 1 with full wear. In order to be able to ensure operation of the friction brake 1 over the entire wear state, the input torque $T_E$ must cover the range that is given by the envelope curve (dotted curve 4c). This input torque $T_E$ is to be provided by the second transmission element 8, which is designed accordingly.

Figure 5:
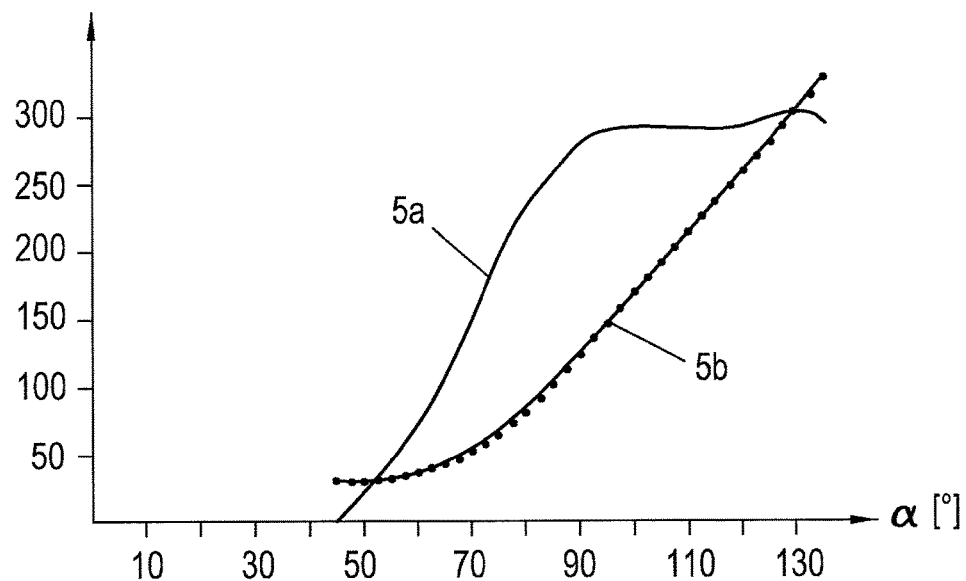
FIG. 5 shows the arising torque and path transmission characteristic of the second transmission element.

For the electrical actuator 12, however, it is especially advantageous if the latter can be operated over the entire actuation range with a torque as constant as possible (for example in case of an electric motor) or with a constant force, preferably in a range with high efficiency. Assuming a desired constant torque of the actuator 12, the input torque $T_E$ or the envelope curve in FIG. 4 (applied to the input rotational angle of the second transmission element 8) directly represents the required torque transmission characteristic (or force transmission characteristic) of the second transmission element 8. However, since the local torque transmission corresponds to the respective slope of the tangent of the path translation characteristic, the path translation characteristic, and thus the shape of the elevation curve 17, conversely results as the integral of the torque transmission characteristic, as shown in FIG. 5. In FIG. 5 the curve 5a shows the torque transmission characteristic (envelope curve with allowance for wear) and the curve 5b the integral of this curve, i.e. the path translation characteristic. The shape of the elevation curve 17 over the rotational angle α (actuation travel) can be derived directly from this in order to achieve a substantially constant torque of the electrical actuator 12. For this reason, a non-linear second transmission element 8 is preferably used, the elevation curve 17 of which is formed according to the path translation characteristic of the first transmission element 5.

For a friction brake with a transmission motor and a first transmission element according to WO 2010/133 463 A1, an actuation time of around 250 ms was measured with a pad pressing force of 40 kN. For a friction brake 1 according to the present invention, the actuation time could be reduced to around 180 ms, which represents a significant improvement.

In many electrically actuated friction brakes 1, it is required that they be self-actuating in an energy-free state (electrical actuator 12 without power) and assume an unbraked state without electrical assistance. That can be impossible with high mechanical friction in the drive of the friction brake 1, because in an electrical actuator 12, a breakaway torque or a breakaway force, which typically is made up of the mechanical bearing friction and the magnetic "snap" and can amount to 10% of the nominal torque or nominal force, must first be overcome. In addition, with a transmission motor as electrical actuator 12, for release, cranking against the gear ratio must also be performed with greater torque than present on the motor shaft. In friction brakes 1 with low mechanical drive friction and/or favorable path of actuation force, the friction brake 1 can press itself open by the high pad pressing force n specific ranges. However, this is not possible in all ranges, as for example with a very small pad pressing force (e.g. braking on ice or snow) no adequate force is available for pressing itself open against the breakaway torque. In this state, a non-electrical, storable auxiliary energy must be present for pressing open of the friction brake 1. These can for example be a release spring, which is tensioned during braking, and which releases the stored energy for pressing open the friction brake 1 when needed.

Figure 6:
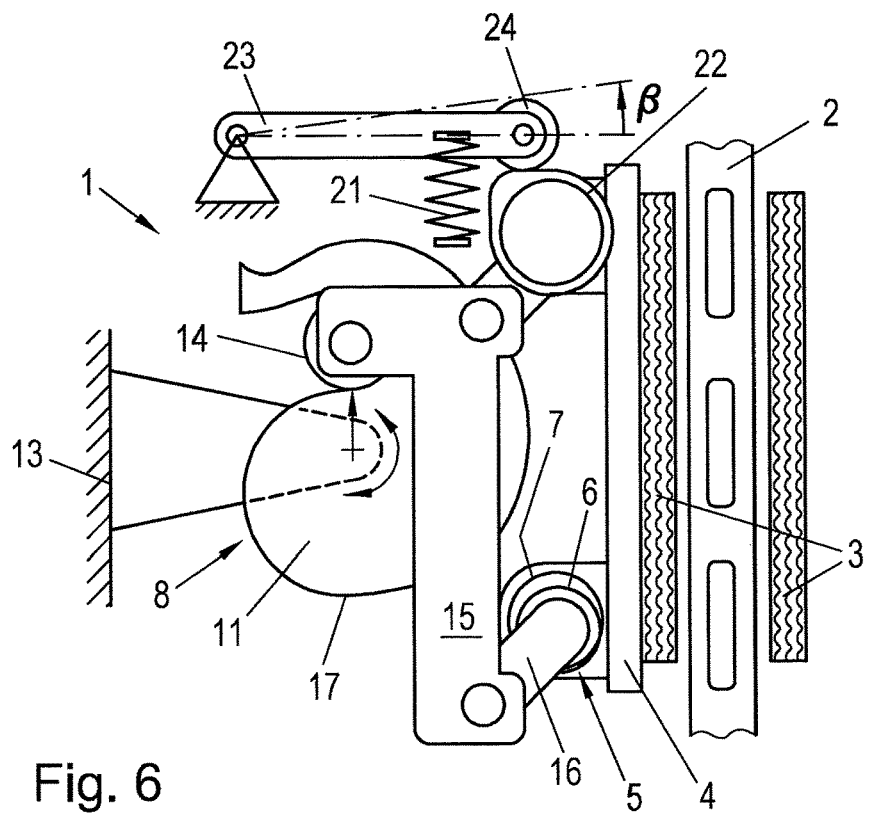
FIG. 6 shows a representation of an inventive friction brake with release spring.

When the auxiliary energy is supplied from actuation of the friction brake 1 itself, for example via a release spring, which is tensioned during brake actuation, the total actuation force (or the total actuation torque) is higher by the value of this spring action. Although the energy would not be lost, because it is recovered again no later than on release of the friction brake 1, it increases the drive torque requirement. Thus, in the simplest case, the release spring would be continuously effective according to their spring characteristic, and thus additionally effective also in the range of large actuation torques, although the release springs in such ranges would be entirely unnecessary for the pressing open of the friction brake 1. This can be counteracted with a non-linear transmission for the release spring by actuating the release spring by means of a suitably designed non-linear transmission, for example a release spring 21 that acts via a spring cam 22, as described below with reference to FIG. 6. The non-linear transmission is also driven by the actuation device 10.

A spring cam 22 is arranged on an actuation shaft 6 and is co-rotated with the actuation shaft 6. A spring lever 23 is rotatably mounted at one end. A spring follower element 24, here for example a rotatably mounted roller, is arranged on the other end of the spring lever 23 and the spring follower element 24 follows the spring cam 22 and rolls thereon. Kinematically speaking, a roller cam follower is therefore implemented again. A release spring 21 acts on the spring lever 23. If the spring cam 22 is rotated, the spring lever 23 is pivoted by an angle β, and the release spring 21 is thus tensioned.

However, without the spring cam 22, the release spring 21 can also act directly on the first transmission element 5 or the second transmission element 8 and release the friction brake 1 and/or support it in actuation. For example, the release spring 21 can pull or press on a lever 16 or the parallelogram drive. Through the selection of the geometry (contact point of the release spring 21 on the actuation device 10 and/or on the friction brake 1), the release spring 21 can deliver variable torques to brake actuation, which can also change magnitude and sign during actuation of the friction brake 1. For example, the return spring torque can become smaller due to the release spring 21 and the geometry when there is an increasing rotational angle α, can change sign and grow larger when there is an further increasing rotational angle α.

This release spring action, however it is caused exactly (cam, direct action of the release spring 21, etc.), can also be effected on different positions of the friction brake 1, not only on the actuation shaft 6 or the lever 16 or the parallelogram, but for example also on the cam disk 11, the shaft of the electrical actuator 12, the transmission stages of the electrical actuator 12, on a separate transmission, etc. In short, at every point of the actuation device 10 via which the return effect or actuation effect of the release spring 21 can be applied by means.

The release spring 21 can also have uncoupling or coupling capabilities, for example by means of an electromagnet, in order for example to exert no actuation effect in an unpowered state, for example when the unpowered friction brake 1 must be forcibly moved to the released state.

The above-described method for obtaining a favorable path transmission characteristic of the second transmission element 8 does not assess the origin of the force (torque). Therefore, the release spring 21, which is always or occasionally necessary for pressing open the friction brake 1, can simply be used as an additional force. One thus obtains a total path transmission characteristic including release spring 21 for forming the transmission of the actuation device 10. The previously described procedure can now be applied to determining the elevation curve of the spring cam 24.

Figure 7:
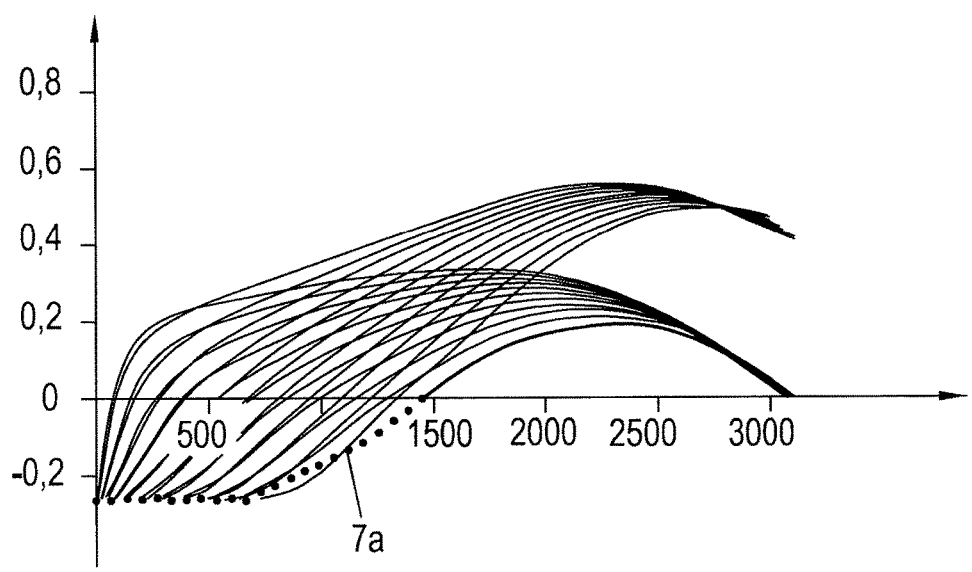
FIG. 7 shows the torque from the internal pad pressing force over the actuation range of the electrical actuator.

FIG. 7 shows the torque that the friction brake 1 exerts from its internal pad pressing force over the actuation range of the electrical actuator 12 on the latter. In the small actuation angle range, the torque is negative, that is, this negative torque is absent in order to release the friction brake 1 automatically. Again, a characteristic diagram over relevant states is used that covers all pad wear states, temperatures, and other influences. Accordingly, the dotted envelope curve 7*a* is the range of the absent release torques and must be supplied by auxiliary energy (for example release spring 21). The cam elevation of the spring cam 22 is thus also established by the course of the release torque (envelope curve 7*a*) and the given kinematics. The release spring 21 is thus only tensioned where it is used as release assistance. If the electrical power supply in this rotational angle range fails, the friction brake 1 is reliably opened by the release spring 21. Outside of this range, the release of the release spring 21 effects support of the electrical actuator 12 for the actuation process of the friction brake. In this way, the otherwise interfering release spring 21 suddenly becomes a support for actuation of the friction brake 1.

Figure 8:
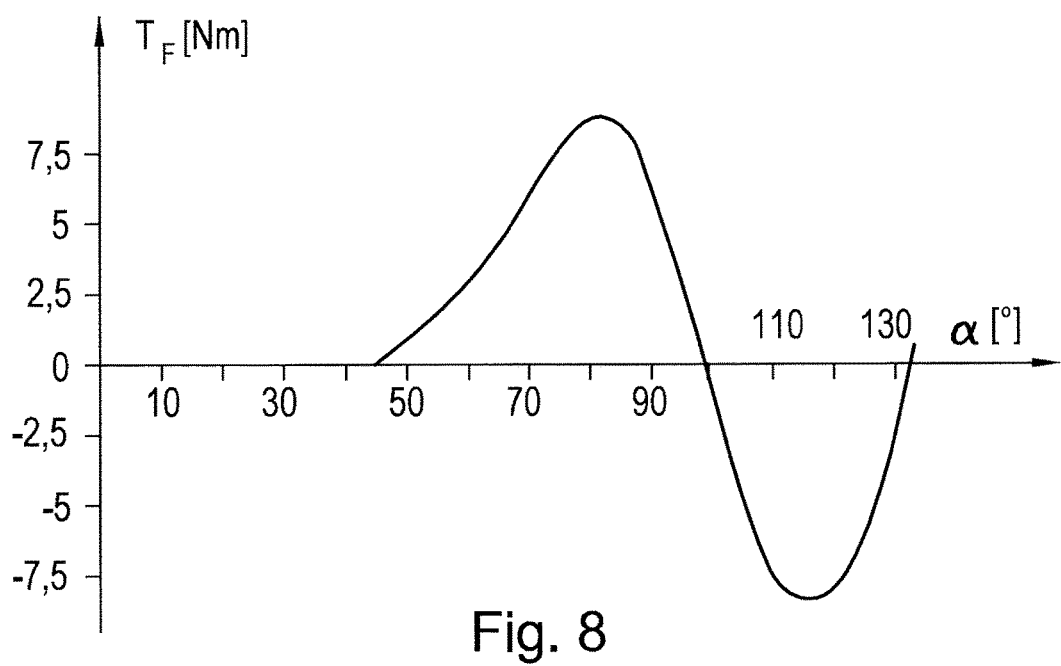
FIG. 8 shows the reset torque of the release spring over the actuation range.

The result is illustrated in FIG. 8, which shows the course of the return torque $T_F$ over the rotational angle of the spring cam 22. The return spring torque $T_F$ acts for small brake actuation as the internal force from the friction brake 1 to release the friction brake 1. With strong braking (larger rotational angle), the release spring 21 is again released, in order to support the electrical actuator 12 in brake actuation.

The transmissions of the actuation device 10 and the release spring 21 mutually influence one another. Therefore, such a friction brake 1 is generally designed in an iterative process in which the optimization steps are repeated until the improvement potential is largely exhausted. One could also proceed in a new design of a friction brake 1 from an already known favorable release spring 21 with transmission or from an already known linear or non-linear transmission of the actuation device 10.

Figure 9:
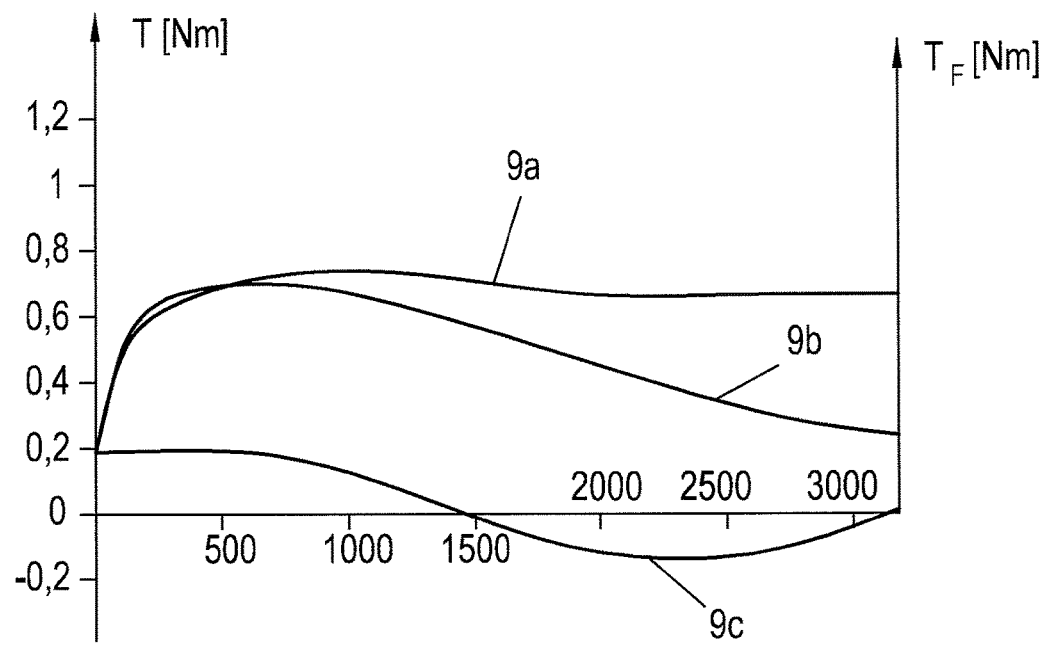
FIG. 9 shows the torque of the electrical actuator of a friction brake according to the invention.

The result of such optimization is illustrated in FIG. 9, for example. The torque T of the electrical actuator 12 (curve 9*a*) and the return spring torque $T_F$ of the release spring 21 (curve 9*c*) are shown over the actuation range of the electrical actuator. Here, the achieved, substantially constant torque T of the electrical actuator over the actuation range is readily recognized. The curve 9*b* additional allows for self-reinforcement effects of the friction brake 1, whereby the necessary torque T of the electrical actuator 12 naturally drops.

The friction brake 1 according to the invention was described above using the example of a brake in which force (torque) must be actively applied in order to press on the brake pads as is required for example in motor vehicles. However, the direction of action of the electrical actuator 12 is insignificant for the invention. The electrical actuator 12 can also prevent the friction brake 1 from actuation with active force (torque), whereby the direction of action would be reversed. The energy for actuation of the friction brake 1 in this case can originate from an auxiliary energy source, such as a spring, for example. Such a friction brake 1 is used, for example, as a railroad brake, elevator brake, crane brake, etc., that has to brake when there is a power loss. The above-described release spring 21 can also be used as an auxiliary energy source for braking, the actuation curve then naturally being designed favorably for the actuation behavior of the brake. For such a friction brake 1, the kinematics can be designed such that in the range to be kept open, the force (torque) at the electrical actuator 12 is as small as possible or even zero. This can occur similarly to as described above for the parking brake function over a special range of the cam disc, slide, or kinematics. A described detent latch could also be used to hold the friction brake 1 open.

In friction brakes 1 that are held in the released state by the electrical actuator 12, for example in a railroad brake or an elevator brake, a spring, and/or the release spring 12, can of course conversely be used for actuation of the friction brake 1. The spring or the kinematics of the actuation device 10 can then also be favorably designed for this reverse actuation behavior. In these spring-actuated friction brakes 1, the actuation device 10 can be designed advantageously such that, for all cases to be covered (different or no self-reinforcement, different pad states and elasticities, different coefficients of friction, tolerances, return torque of the motor ("cogging") in different motor states (also unpowered), different friction losses in actuation, temperature, etc.), reliable actuation by the spring is always possible.

The invention claimed is:

1. An electrically actuated friction brake comprising:
a brake pad that exerts a pad pressing force during brake action;
an actuation device actuating the brake pad;
an electric actuator driving the actuation device;
a first transmission element connected to the brake pad and comprising a coupling element;
said actuation device being configured to rotate the first transmission element about a rotation angle during the brake action, whereby the pad pressing force results from the first transmission element receiving an input torque that depends on the rotation angle of the first transmission element;
a second transmission element having an elevation curve and being rotated by the electric actuator;
a follower element arranged on the coupling element and being configured to follow the elevation curve under action of the electric actuator when the electric actuator rotates the second transmission element; and
a lever having a first end rotatably coupled to the coupling element and a second end coupled to the first transmission element,
wherein the second transmission element provides the input torque for the first transmission element.

2. The electrically actuated friction brake of claim 1, wherein plural input torques of the first transmission element over the rotation angle for different wear states of the brake pad result in an envelope curve and the input torque provided by the second transmission element over the rotational angle covers a range of the envelope curve.

3. The electrically actuated friction brake of claim 1, wherein the second transmission element is one of:
a cam disc; and
a movable element having a non-circular elevation curve.

4. The electrically actuated friction brake of claim 1, further comprising a third transmission element connected to the brake pad.

5. The electrically actuated friction brake of claim 4, further comprising a parallelogram device that includes:
the lever; and
a second lever having a first end rotatably coupled to the coupling element and a second end coupled to the third transmission element.

6. The electrically actuated friction brake of claim 1, wherein the elevation curve is a non-circular elevation curve that comprises one of:
a stable position element interacting with the follower element; and
an indentation defining a stable position of the follower element.

7. The electrically actuated friction brake of claim 1, wherein the first transmission element comprises one of:
an eccentric drive; and
a cam drive.

8. The electrically actuated friction brake of claim 1 wherein the elevation curve is a non-circular elevation curve and is defined by a path translation characteristic of the first transmission element.

9. The electrically actuated friction brake of claim 1, further comprising a release spring.

10. The electrically actuated friction brake of claim 9, further comprising a spring cam and a spring follower element movably contacting the spring cam, whereby the release spring biases the spring follower element toward contact with the spring cam.

11. An electrically actuated friction brake comprising:
a brake pad;
an actuation device actuating the brake pad;
an electric actuator driving the actuation device;
a first transmission element connected to the brake pad and comprising a coupling element;
said actuation device being configured to rotate the first transmission element about a rotation angle during brake action that achieves a pad pressing force, said pad pressing force resulting from the first transmission element receiving an input torque that depends on the rotation angle;
a second transmission element having an elevation curve and being rotated by the electric actuator;
a follower element arranged on the coupling element and being configured to follow the elevation curve under action of the electric actuator when the electric actuator rotates the second transmission element;
a third transmission element connected to the brake pad; and
a parallelogram drive comprising:
a first lever having a first end rotatably coupled to the coupling element and a second end coupled to the first transmission element; and
a second lever having a first end rotatably coupled to the coupling element and a second end coupled to the third transmission element,
wherein the second transmission element provides the input torque for the first transmission element.

12. The electrically actuated friction brake of claim 11, wherein plural input torques of the first transmission element over the rotation angle for different wear states of the brake pad result in an envelope curve and the input torque provided by the second transmission element over the rotational angle covers a range of the envelope curve.

13. An electrically actuated friction brake comprising:
a brake pad;
an actuation device actuating the brake pad;
an electric actuator driving the actuation device;
a first transmission element connected to the brake pad and comprising a coupling element;
the coupling element being a rocker lever having a knee joint, a first leg, and a second leg coupled to the first transmission element;
said electric actuator acting on the first leg;
said actuation device being configured to rotate the first transmission element about a rotation angle during brake action that achieves a pad pressing force, said pad pressing force resulting from the first transmission element receiving an input torque that depends on the rotation angle;
a second transmission element having an elevation curve and being rotated by the electric actuator; and
a follower element arranged on the coupling element and being configured to follow the elevation curve under action of the electric actuator when the electric actuator rotates the second transmission element,
wherein the second transmission element provides the input torque for the first transmission element.

14. The electrically actuated friction brake of claim 13, wherein plural input torques of the first transmission element over the rotation angle for different wear states of the brake pad result in an envelope curve and the input torque provided by the second transmission element over the rotational angle covers a range of the envelope curve.

* * * * *